United States Patent
Stanzani et al.

(10) Patent No.: US 11,699,912 B2
(45) Date of Patent: Jul. 11, 2023

(54) REMOVAL PREDICTION OF A DATA READER FROM A CHARGING BASE UNIT

(71) Applicant: Datalogic IP Tech S.r.l., Lippo di Calderara di Reno (IT)

(72) Inventors: Luca Stanzani, Renazzo (IT); Riccardo Rosso, Ozzano Emilia (IT); Simone Stefanini, Bologna (IT); Mauro Pecorari, Porto Potenza Picena (IT)

(73) Assignee: Datalogic IP Tech S.R.L., Bologna (IT)

( * ) Notice: Subject to any disclaimer, the term of this patent is extended or adjusted under 35 U.S.C. 154(b) by 0 days.

(21) Appl. No.: 17/647,661

(22) Filed: Jan. 11, 2022

(65) Prior Publication Data

US 2022/0129059 A1 Apr. 28, 2022

Related U.S. Application Data

(63) Continuation of application No. 16/270,529, filed on Feb. 7, 2019, now Pat. No. 11,221,663.

(51) Int. Cl.
*H02J 7/00* (2006.01)
*G01L 1/14* (2006.01)
(Continued)

(52) U.S. Cl.
CPC ............ *H02J 7/0044* (2013.01); *G01L 1/14* (2013.01); *G06F 1/3231* (2013.01);
(Continued)

(58) Field of Classification Search
CPC ..... G06F 1/3231; G01L 1/14; G06K 7/10881; G06K 2207/1012; H02J 20/10; H02J 7/0044; H02J 7/025
See application file for complete search history.

(56) References Cited

U.S. PATENT DOCUMENTS 5,436,088 A 7/1995 Castaneda et al.
6,405,049 B2 6/2002 Herrod et al.
(Continued)

FOREIGN PATENT DOCUMENTS

CN 105652915 A 6/2016
CN 108987833 A 12/2018
(Continued)

OTHER PUBLICATIONS

International Searching Authority, International Search Report and Written Opinion for PCT/IB2020/050934, dated Apr. 15, 2020, 16 pages.

(Continued)

*Primary Examiner* — Jaweed A Abbaszadeh
*Assistant Examiner* — Hyun Soo Kim
(74) *Attorney, Agent, or Firm* — Stoel Rives LLP

(57) ABSTRACT

A data reading system for predicting the removal of a data reader from a charging base unit based on the approach of a user's hand. The data reading system includes a data reader with a power supply, a base unit configured to receive the data reader and to charge the power supply of the data reader responsive to the data reader being coupled to the base unit, a sensor configured to detect the approach of a user's hand, and a processor in operable communication with the sensor and the data reader or the base unit. The processor is configured to apply an appropriate action, such as adjust an amount of current used to charge the power supply of the data reader in the base unit responsive to the sensor detecting the approach of the user's hand.

20 Claims, 5 Drawing Sheets

(51) Int. Cl.
  *G06F 1/3231* (2019.01)
  *G06K 7/10* (2006.01)
  *H02J 50/10* (2016.01)

(52) U.S. Cl.
  CPC ...... *G06K 7/10881* (2013.01); *H02J 7/00034* (2020.01); *H02J 50/10* (2016.02); *G06K 2207/1012* (2013.01)

(56) References Cited

U.S. PATENT DOCUMENTS

| | | | |
|---|---|---|---|
| 8,169,185 B2 | 5/2012 | Partovi et al. | |
| 8,493,074 B2 | 7/2013 | Unterreitmayer et al. | |
| 9,047,359 B2 | 6/2015 | Caballero et al. | |
| 9,117,129 B1 | 8/2015 | Koch | |
| 9,236,860 B2 | 1/2016 | Unterreitmayer et al. | |
| 9,459,746 B2 | 10/2016 | Rosenberg et al. | |
| 2005/0224583 A1 | 10/2005 | Tamburrini et al. | |
| 2007/0216174 A1* | 9/2007 | Tanimoto | E05B 81/78 292/336.3 |
| 2011/0057606 A1* | 3/2011 | Saunamaki | H02J 50/10 320/108 |
| 2011/0290889 A1* | 12/2011 | Tamburrini | G06K 7/109 235/472.01 |
| 2012/0126747 A1 | 5/2012 | Kiko et al. | |
| 2012/0242285 A1* | 9/2012 | Jung | H02J 50/12 320/108 |
| 2013/0057299 A1 | 3/2013 | Unterreitmayer | |
| 2013/0082651 A1* | 4/2013 | Park | H02J 50/80 320/108 |
| 2013/0103207 A1* | 4/2013 | Ruff | F24F 11/70 700/278 |
| 2013/0109369 A1 | 5/2013 | Forutanpour et al. | |
| 2013/0335319 A1 | 12/2013 | Balasundaram et al. | |
| 2013/0341406 A1 | 12/2013 | Tamburrini et al. | |
| 2014/0285218 A1 | 9/2014 | Chang | |
| 2014/0361979 A1 | 12/2014 | Woo et al. | |
| 2015/0130743 A1* | 5/2015 | Li | G06F 3/0416 345/174 |
| 2015/0237183 A1 | 8/2015 | Novet | |
| 2015/0280598 A1 | 10/2015 | Zur et al. | |
| 2017/0066334 A1* | 3/2017 | Sindia | H02J 50/10 |
| 2017/0155259 A1 | 6/2017 | Mecca et al. | |
| 2018/0102606 A1* | 4/2018 | Tham | H02J 7/0068 |
| 2019/0229538 A1 | 7/2019 | Zhang et al. | |

FOREIGN PATENT DOCUMENTS

| | | |
|---|---|---|
| EP | 2485462 A1 | 8/2012 |
| WO | 2014077978 A1 | 5/2014 |

OTHER PUBLICATIONS

European Patent Office, Communication pursuant to Article 94(3) EPC from European Patent Application No. 20705529.4, dated Sep. 13, 2022, 28 pages.

\* cited by examiner

US 11,699,912 B2

REMOVAL PREDICTION OF A DATA READER FROM A CHARGING BASE UNIT

BACKGROUND

The field of the present disclosure relates generally to portable handheld data readers such as scanners, optical code reading devices, electronic tag readers, and other mobile electronic devices. More particularly, the present disclosure relates to systems and methods for charging the portable handheld data readers and predicting the removal of the data reader from a charging base unit before the data reader is removed from the charging base unit.

Understanding that the drawings depict only certain embodiments and are not, therefore, to be considered limiting in nature, these embodiments will be described and explained with additional specificity and detail with reference to the drawings.

DETAILED DESCRIPTION OF DISCLOSED EMBODIMENTS

Figure 1:
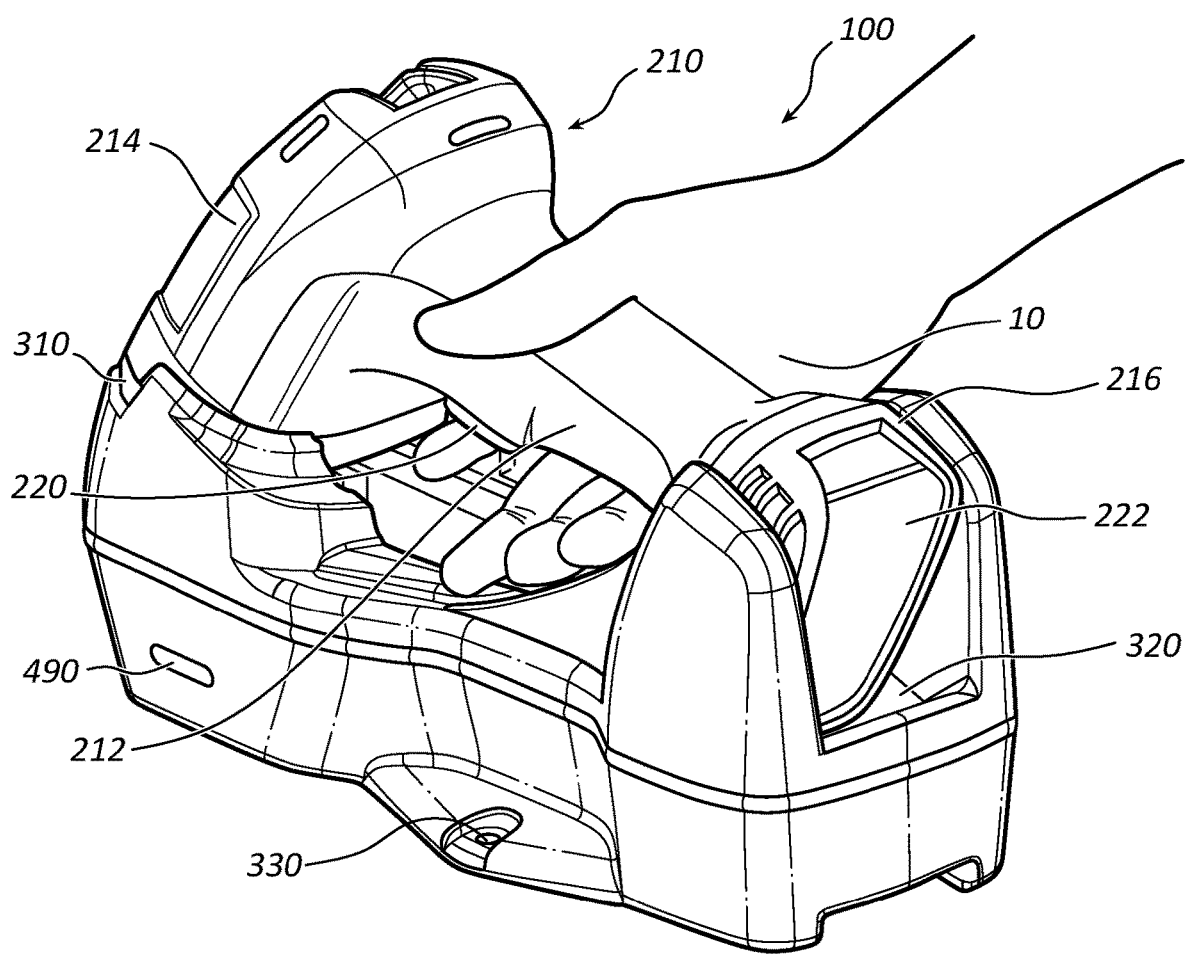
FIG. 1 illustrates a perspective view of a data reading system for charging a data reader, according to one embodiment.

With reference to the drawings, this section describes particular embodiments and their detailed construction and operation. The embodiments described herein are set forth by way of illustration only and not limitation. The described features, structures, characteristics, and methods of operation may be combined in any suitable manner in one or more embodiments. In view of the disclosure herein, those skilled in the art will recognize that the various embodiments can be practiced without one or more of the specific details or with other methods, components, materials, or the like. In other instances, well-known structures, materials, or methods of operation are not shown or not described in detail to avoid obscuring more pertinent aspects of the embodiments.

In the following description of the figures and any example embodiments, certain embodiments may describe use of a charging base unit for charging portable handheld data readers such as scanners, optical code reading devices, electronic tag readers, and other mobile electronic devices. It should be understood these examples are merely example uses for the described system and should not be considered as limiting.

Electric arc is a phenomenon that occurs during the opening and closing of a switch in an electric circuit. Electric arc consists of an electrical discharge with a light emission that occurs between two electrodes immersed in a gas between which an electrical voltage is maintained. If the dielectric medium is air, it is referred to as an air arc.

The described phenomenon of electric air arc may also occur between power supply contacts between a portable handheld data reader and a charging base unit. The occurrence of the electric arc generates potentially overheating/overstressing of the power supply contact and consequent deterioration of the contact's efficiency. This may affect the electrical contact between the portable handheld reader and its corresponding charging base unit. This phenomenon may be influenced by the amount of current flowing between the contacts, the dielectric material between the contacts, and the separation speed between the corresponding contacts of the portable handheld data reader and the charging base unit. Environmental conditions (humidity, periodical cleaning of contacts, environment dirt/dust) can also worsen the effects of electric arc.

In the situation where a portable handheld data reader is removed from a corresponding base unit, it is difficult to change the electric arc by changing the dielectric material from air to another material. It is also difficult to change the contact separation speed because the separation speed of the electric contacts is related to user behavior. Accordingly, one may reduce the arc phenomenon by lowering the charging current in advance of the portable handheld data reader being removed from the charging base unit.

Accordingly, the present disclosure contemplates and describes various apparatuses and methods for predicting (e.g., anticipating, foreseeing, etc.) the removal of the data reader from a charging base station and taking specific actions in response. For example, the base station may lower or eliminate the current used to charge the data reader when the data reader is placed in the charging base station before the data reader is removed to avoid/mitigate electric arc. Additional actions are described later in the specification. A data reading system may anticipate the removal of the data reader from the charging base station by detecting the proximity of a user's hand to the data reader with enough time to reduce or eliminate the charging current. The present disclosure also contemplates and describes apparatuses and methods in which the charging base station charges the data reader via wireless charging (e.g. inductive coupling). Predicting removal of the data reader from the charging base station and reducing the charging current by the charging base station may reduce or eliminate overvoltage/overcurrent situations or other related issues.

Various benefits may be realized by reducing or eliminating the charging current before the data reader is removed from the charging base unit. For example, if the charging current is reduced or eliminated before the removal of the data reader from the base unit, a higher charging current may be used to charge the data reader. Higher charging current helps charge a power supply of the portable handheld data reader faster and reduce charging times. As a result, the data reader may be improved with increased operative time, increased battery capacity, and/or reduced charging time. Further, when the charging current is reduced or eliminated before the data reader is removed from the base unit, the electric arc is reduced and damage to the electric contacts between the data reader and the base unit is reduced.

Figure 2:
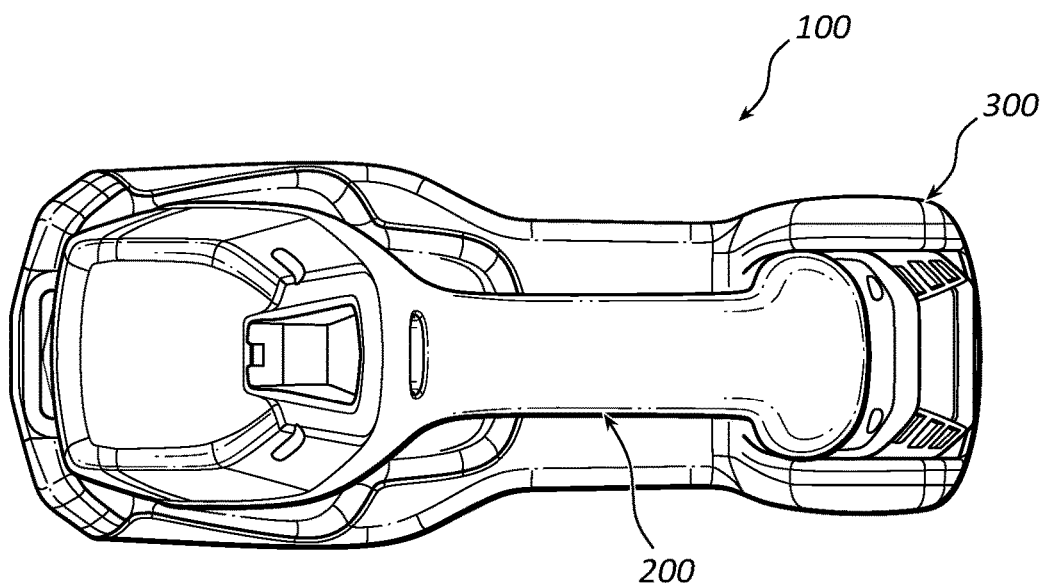
FIG. 2 illustrates a top view of the data reading system of FIG. 1.

FIGS. 1 and 2 illustrate a data reading system 100. In particular, FIG. 1 illustrates the data reading system 100 in a perspective view and FIG. 2 illustrates the data reading system 100 in a top view. The data reading system 100 may include a data reader 200 and a base unit 300 (e.g., cradle). The base unit 300 is configured to receive the data reader 200 in a longitudinal direction with respect to the base unit 300. The base unit 300 is configured to charge a power supply 222 disposed on the data reader 200 when the data reader 200 is coupled with the base unit 300. The base unit 300 may recharge the power supply 222 of the data reader 200 in a variety of different manners, such as inductive charging or conductive charging. The data reader 200 and the base unit 300 may be configured to communicate with each other via radio frequency (RF), WiFi, Near Field Communication (NFC) or other wireless communications methods. In some embodiments, the data reader 200 and the base unit 300 may be configured to communicate data with each other via modulation of the charging field. In some embodiments, a wired data communication connection may be utilized for communicating information between the data reader 200 and the base unit 300 regarding the predicted removal of the data reader 200.

The data reader 200 may be a handheld portable device for scanning and reading barcodes, such as scanners, optical code reading devices, or electronic tag readers (e.g., "radio-frequency identification" (RFID)). The data readers may read (e.g., scan, image, etc.) barcodes, QR codes, symbols, object identifications, electronic tags, etc.

The data reader 200 may include a housing 210 with a central hand grip section 212, an upper head section 214, and a lower foot section 216. The data reader 200 may further include an imaging system 218 (see FIG. 3B). For example, the imaging system 218 may be a spot scanner, a charge coupled device (CCD), a complementary metal oxide semiconductor (CMOS), or other suitable system. The housing 210 may include a trigger 220 on a front side of the housing 210 to activate the imaging system 218 responsive to the user engaging the trigger with one of their fingers.

The data reader 200 may further include a power supply 222. Examples of the power supply 222 may include lithium batteries, supercapacitor, etc. The power supply 222 is configured to power the components of the data reader 200, such as the circuitry and imaging system 218. The power supply 222 may be a rechargeable battery that may be recharged via any suitable charging method, such as inductive charging or conductive charging, responsive to the data reader 200 being placed on or within the base unit 300.

The data reader 200 is shown having a generally gun or pistol-shaped housing 210 with the trigger-finger actuated trigger 220 positioned at an appropriate forward position. Alternatively, the housing 210 may be of other shape configurations such as box-shaped with one or more windows or other configurations such as the data readers described in U.S. Pat. No. 7,243,850, titled "Data Reader for Multi-Mode Operation", issued Jul. 17, 2007, the disclosure of which is hereby incorporated by reference in its entirety, the housing 210 preferably equipped with a suitable actuator button(s).

The base unit 300 may serve as a platform for supporting the data reader 200 on a flat surface such as a countertop (which is typically horizontal) or a wall (which is typically vertical). The base unit 300 may include a head receiving portion 310 and a foot receiving portion 320. The head receiving portion 310 is configured to receive (e.g., cradle) the upper head section 214 of the data reader 200 and the foot receiving portion 320 is configured to receive the lower foot section 216 of the data reader 200. In this manner, the central hand grip section 212 is open and there is a space for the fingers of the user's hand 10 to grip the central hand grip section 212 to remove (e.g., extract) the data reader 200.

As discussed previously, the base unit 300 may be configured to recharge the power supply 222 of the data reader 200 responsive to the data reader 200 being placed on or within the base unit 300. In some embodiments, the data reader 200 may be recharged via conductive charging. Conductive charging requires a physical connection (metal-to-metal) between the power supply 222 of the data reader 200 and a power source of the base unit 300. The power source of the base unit 300 may be alternating current (AC) from a wall outlet. The base unit 300 may comprise a metal contact 322 to contact a metal contact 224 of the data reader 200. In some embodiments, the base unit may be a docking station (e.g., cradle) that receives the data reader 200. The cradle may be configured to align the metal contacts 322 with the power supply 222 to allow current flow.

In some embodiments, the data reader 200 may be recharged via wireless power transfer ("wireless charging"), such as inductive charging. Inductive charging uses an inductive coil to generate an electromagnetic field to transfer energy between the data reader 200 and the base unit 300. Energy is sent through inductive coupling to the data reader 200 to charge the power supply 222. The base unit 300 may include an induction coil (not shown) to create an alternating electromagnetic field within the base unit 300, and the data reader 200 has a second induction coil (not shown) that transfers power from the electromagnetic field and converts it into electric current to charge the power supply 222 of the data reader 200. Example embodiments of base units that provide inductive or wireless charging may be found in U.S. patent application Ser. No. 15/885,637, titled "Wireless Charging and Docking System for Mobile Electronic Devices" filed Jan. 31, 2018, the disclosure of which is hereby incorporated by reference in its entirety. In some embodiments, the base unit 300 may be a charging pad upon which multiple data readers 200 may be placed for charging. Such a charging pad may include one or more transmitting coils. In some embodiments, the base unit 300 may be configured to adjust the charging current according to the number of data readers 200 placed on the base unit 300 for charging.

In some embodiments, the base unit 300 may include a plurality of apertures 330 for securing or temporarily mounting the base unit 300 to the countertop or wall via fasteners. The illustrated embodiment of FIG. 1 merely illustrates a single aperture 330 disposed on a side of the base unit 300 because FIG. 1 is a perspective view of the data reading system 100. A second aperture 330 may be disposed in a similar position on an opposite side of the base unit 300. In some embodiments, the base unit 300 may not include the apertures 330, such as the embodiment illustrated in FIG. 2.

The data reading system 100 may include a sensor (such as a capacitive sensor 400 in FIGS. 3A and 3B) operable to detect the proximity of a user's hand 10 to anticipate the removal of the data reader 200 from the base unit 300. The capability to predict (e.g., foresee, anticipate, etc.) the extraction or removal of the data reader 200 from the base unit 300 may activate appropriate actions depending a specific circumstance based on system logic (discussed in more detail below) found within the data reader 200 or the base unit 300. For example, if extraction of the data reader 200 is anticipated, the data reading system 100 can be furtherly configured to reduce or stop the current flow being used to charge the power supply 222 of the data reader 200 before the data reader is removed from the base unit 300 by the user. This may be beneficial when high charging currents are used to charge the data reader 200 because it helps avoid the electric arc phenomenon in conductive charging. Electric arcs can damage the metal contacts 224 and 322, thus reducing charging efficiency, as mentioned previously. In wireless charging, a reduced charging current helps protect from an overvoltage due to an increase in distance of the coils during extraction.

Sensors may include an infrared sensor, a light sensor, a capacitive sensor, or other suitable sensor capable of detecting a position of the user's hand relative to the sensor. The proximity sensors are configured to detect a threshold change that indicates the approach of the user's hand 10. Responsive to the threshold change is detected, the data reading system 100 may take a number of different actions, such as reducing or stopping the current flow to charge the data reader 200, activating the data reader 200 from an idle state, activating a locking mechanism, ending communication (e.g., data transfer, data downloads, software updates, etc.) between the data reader 200 and the base unit 300, etc. These actions will be described in more detail below.

Figure 3A:
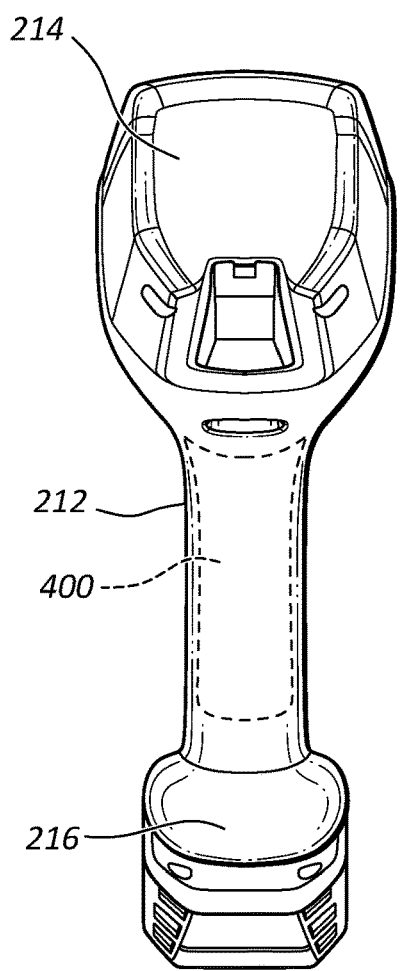
FIG. 3A illustrates a rear view of a data reader of the FIG. 1.
Figure 3B:
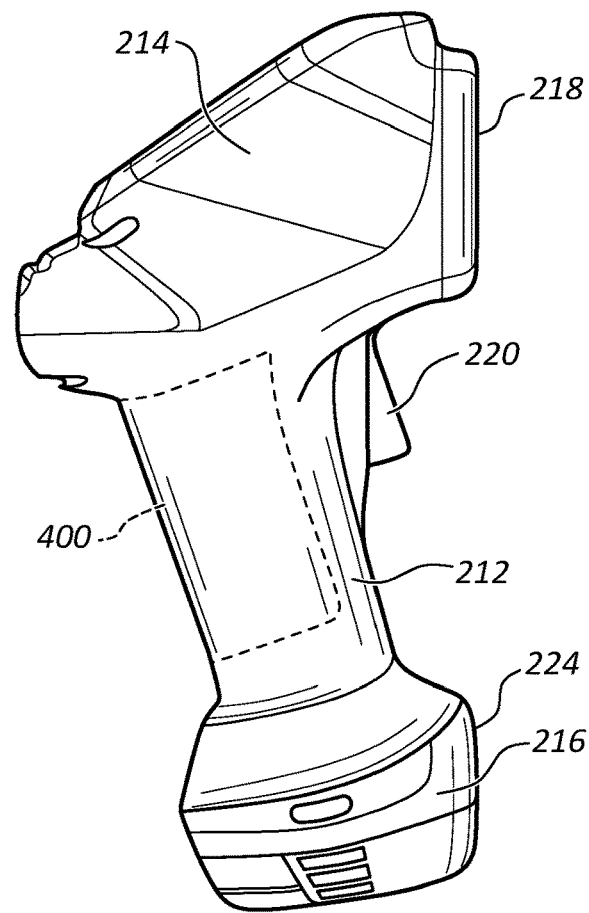
FIG. 3B illustrates a side view of the data reader of FIG. 3A.

In the illustrated embodiment of FIGS. 3A and 3B, a capacitive sensor 400 is disposed in the central hand grip section 212 of the data reader 200. The capacitive sensor 400 is configured to detect the proximity of a user's hand 10. The capacitive sensor 400 is configured to detect and measure anything that is conductive or has a dielectric property different from air, such as the user's hand 10. For example, the capacitive sensor 400 is configured to detect a change in capacitance responsive to the user gripping the central hand grip section 212 of the data reader 200. Capacitive sensors are sensitive enough to detect a change in capacitance even when the user's hand 10 is wearing a glove or if the hand is wet. The detecting range of the capacitive sensor 400 is dependent on the size of the capacitive sensor 400. The larger the capacitive sensor 400, i.e. the larger the armature of the capacitive sensor 400, and thus the greater the detection distance. In some embodiments, the detection distance range of the capacitive sensor 400 may be from approximately 0 cm to 5 cm.

The capacitive sensor 400 illustrated in FIGS. 3A and 3B may be shielded within central hand grip section 212 of the data reader 200 from any of the other electronic components of the data reader 200 to avoid any unintentional inference from other electronic circuits of the data reader 200.

Figure 4A:
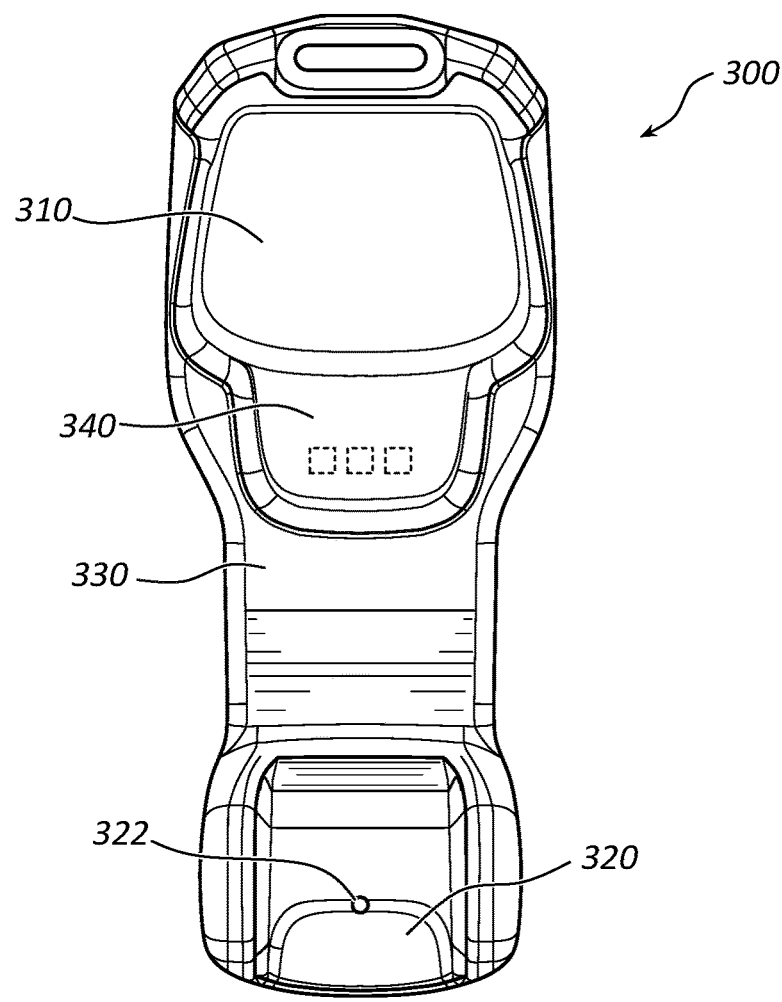
FIG. 4A illustrates a base unit of the data reading system of FIG. 1 according to one embodiment.
Figure 4B:
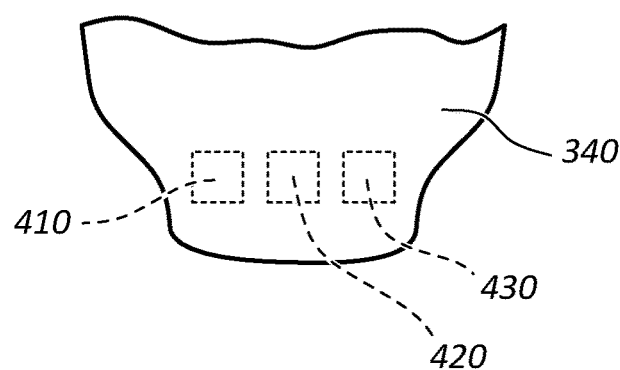
FIG. 4B illustrates a detail view of the base unit of FIG. 4A depicting an exemplary placement of a plurality of capacitive sensors.

In the illustrated embodiment of FIGS. 4A and 4B, the base unit 300 may include a plurality of capacitive sensors. FIG. 4A illustrates a top view of the base unit 300 with the data reader 200 extracted. FIG. 4B illustrates a detailed view of the plurality of capacitive sensors 410, 420, and 430 (e.g., capacitive touch pads). While FIGS. 4A and 4B illustrate three capacitive sensors, the present disclosure is not so limited. The base unit 300 may have more or fewer than three capacitive sensors. The capacitive sensors 410, 420, and 430 are disposed beneath an upper cover 340 of the base unit 300 and are configured to detect the proximity of a user's hand 10. The capacitive sensors 410, 420, and 430 may be aligned in a transverse direction of the base unit 300 and disposed between the head receiving portion 310 and the foot receiving portion 320. Since the capacitive sensors 410, 420, and 430 are disposed between the head receiving portion 310 and the foot receiving portion 320, the capacitive sensors 410, 420, and 430 are configured to sense a change in capacitance responsive to the user gripping the central hand grip section 212 of the data reader 200. Specifically, the capacitive sensors 410, 420, and 430 may be configured to detect the change in capacitance responsive to the fingers of the user's hand 10 entering the space between the upper cover 340 of the base unit 300 and the central hand grip section 212 of the data reader 200.

In some embodiments, the capacitive sensors 410, 420, and 430 may be aligned in a longitudinal direction of the base unit 300 between the head receiving portion 310 and the foot receiving portion 320. However, different geographic placements of the capacitive sensors 410, 420, and 430 to detect the approach of the user's hand 10 and predict removal of the data reader 200 from the base unit 300 are within the scope of the present disclosure In embodiments that include more than one capacitive sensor, e.g., FIGS. 4A and 4B, the data reading system 100 may be more able to more accurately predict the probability of the data reader 200 being removed from the base unit 300. For example, the three capacitive sensors 410, 420, and 430 of FIGS. 4A and 4B are aligned in a transverse direction of the base unit 300. Each capacitive sensor 410, 420, 430 may be configured to detect a threshold change in capacitance at different times. For example, if a right-handed person removed the data reader 200 from the base unit 300 with his right hand, the capacitive sensor 430, the one on the right, may detect the threshold change in capacitance before the capacitive sensor 410 on the left. This would be the opposite for a left-handed person removed the data reader 200 from the base unit 300 with his left hand; the capacitive sensor 410 on the left would detect the threshold change in capacitance before the capacitive sensor 430 on the right. This helps the data reading system 100 to accurately predict the removal of the data reader 200 form the base unit because not only is the user's hand near the data reader 200 but in is also within the gap between the data reader 200 and the base unit 300. In some situations, the data reading system 100 may be configured to not adjust the charging current until a predetermined number (e.g., a majority) of the capacitive sensors 410, 420, 430 have detected the threshold change in capacitance. For example, in the example of three capacitive sensors, the charging current may be adjusted only after a majority, i.e., two of the three, have detected the threshold change in capacitance.

The capacitive sensors 410, 420, and 430 illustrated in FIGS. 4A and 4B may be shielded with the base unit 300 from any of the other electronic components of the base unit 300 to avoid any unintentional inference from other electronic circuits of the data reader 200.

In some embodiments, a proximity sensor 490 may be disposed on a side of the base unit 300, as illustrated in FIG. 1. The proximity sensor 490 may be activated by a specific gesture of the user to reduce the light intensity of the base unit 300 during the charging process. Exemplary gestures may include swiping with a finger on the side of the base unit 300 at the proximity sensor 440.

Figure 5:
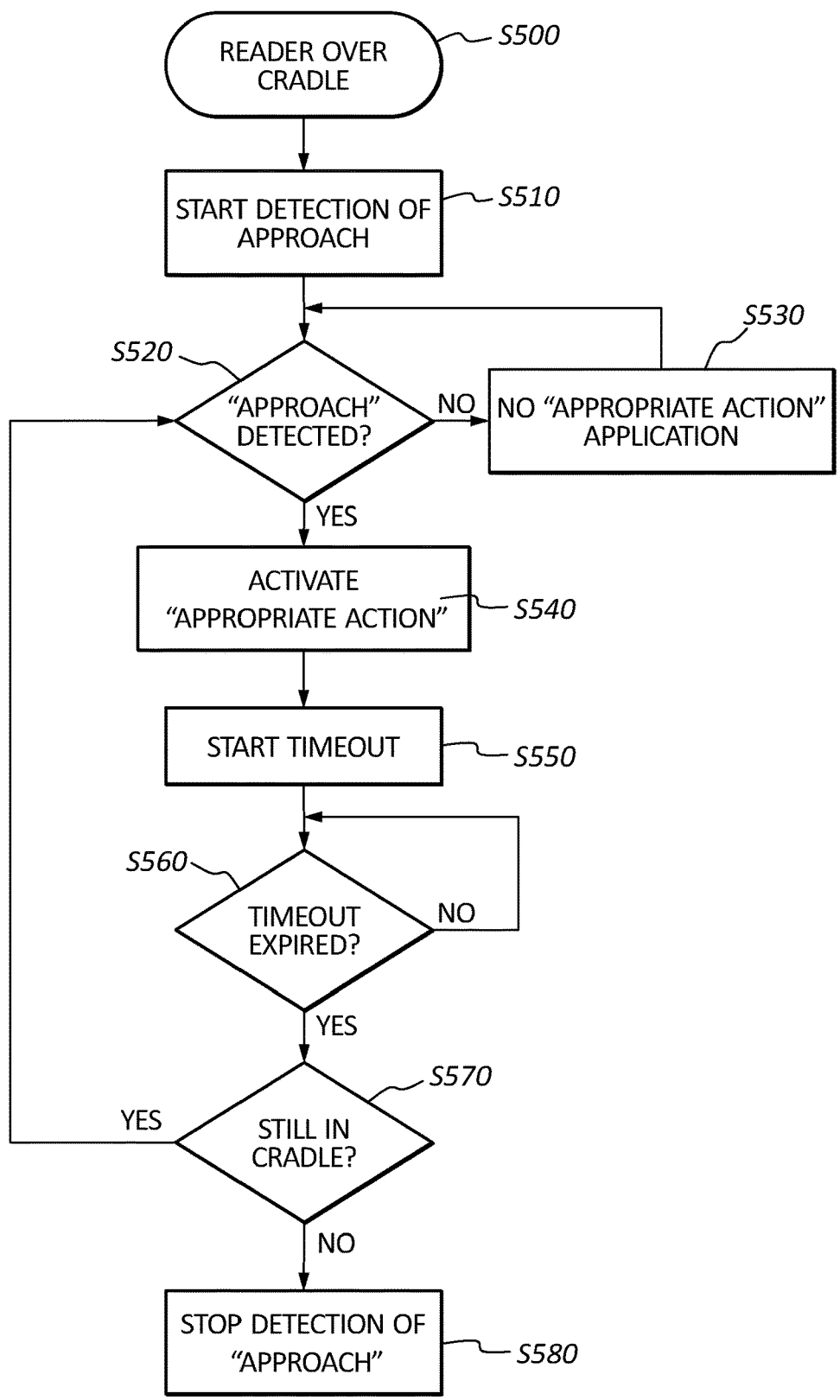
FIG. 5 illustrates a flowchart of proximity detection.

FIG. 5 illustrates a flowchart of a method of recharging a data reader 200 using proximity detection of a user's hand 10 to predict the removal of the data reader 200 from the base unit 300. The data reader 200 and the base unit 300 each have a processor that in configured to execute the method illustrated in FIG. 5. In step S500, the data reader 200 is on or within the base unit 300. Responsive to the data reader 200 being on or within the base unit 300, the base unit 300 charges the power supply 222 of the data reader 200. Typically, the current and voltage determine how quickly the data reader 200 is recharged. A high current enables the data reader 200 to charge quicker. In one embodiment, the charging current may be approximately 15 amps. While the high charging current enables quicker recharge, it also may create a bigger electric arc if that data reader 200 is removed from the base unit 300 while the high current is applied.

In step S510, when the data reader 200 is coupled with the base unit 300, the data reading system 100 initiates approach detection mode. The approach detection may utilize any of the proximity sensors discussed previously, such as the capacitive sensor 400 disposed in the handle of the data reader 200, the capacitive sensors 410, 420, and 430 disposed in the base unit 300, or the proximity sensor 440 disposed in the side of the base unit 300. Various other configurations of sensors are also contemplated and within the scope of the present disclosure.

In step S520, an approach of user's hand 10 is detected responsive to the proximity sensor detecting a threshold change for the appropriate sensor that corresponds with the approach of the user's hand 10. For example, the capacitive sensor may detect a threshold change in capacitance that would indicate that the user's hand 10 was approaching to remove the data reader 200 from the base unit 300. The threshold change is a predetermined change that predicts a removal of the data reader 200 from the base unit 300. If a change in the appropriate sensor is detected, but the detected capacitance change does not surpass the predetermined threshold, then the data reading system 100 enacts step S530. During step S530, the data reading system 100 continues to measure capacitance changes to detect a potential approach.

In step S540, if an approach is detected, e.g., the threshold change is surpassed, the data reading system 100 enacts an "appropriate action." "Appropriate action" may refer any appropriate action based on the application. For example, it may refer to adjusting the charging current used to charge the power supply 222 of the data reader 200, or sounding a warning if the scanner cannot be extracted at a particular moment, etc. The data reader 200 may communicate with the base reader (e.g., via RF, modulating the charging field, or other communication methods) to inform the base unit 300 when approach is detected. In some embodiments, when the "appropriate action" is enacted, the charging current is stopped. In some embodiments, the amount of charging current is reduced to a lower charging current to reduce the electric arc. A reduced charging current may be around 1-3 amps. In other embodiments, the charging current may be reduced to below 0.5 amps, which helps reduce electric arc and preserve the metal contacts 322.

In step S550, the data reading system 100 enacts a timeout period. The timeout period is a predetermined amount of time for the data reading system 100. After the predetermined amount of time expires in S560, the data reading system 100 determines in step S570 if the data reader 200 is still within the base unit 300. If the data reader 200 has been removed from the base unit 300, then the data reading system 100 stops the detection of a potential approach in S580. If the base unit 300 is a conductive charging, the charging switch opens when the data reader is disconnected from the metal contacts 322. If the base unit 300 is an inductive (e.g., wireless charging system), the base unit 300 detects the removal of the data reader based on the coupling factor between the coils decreasing below a predetermined threshold.

In some situations, the data reader 200 may still be on or within the base unit 300 after the threshold change has been detected. In this situation, it is possible that the user went to remove the data reader 200 but decided not to. Accordingly, the data reading system 100 returns to step S520 to determine if an approach has been detected, and if not, the "appropriate action" is terminated and the high current (e.g., 15 amps) may be applied to recharge the power supply 222 of the data reader 200.

In similar situations, the proximity sensors are able to determine if the user has removed his hand from the data reader 200. If the user has removed his hand from the data reader 200 and the data reader 200 is on or within the base unit 300, then the data reading system 100 may charge the power supply 222 of the data reader 200 with a high current.

In some embodiments, the predetermined threshold change may be able to adapt over time. As the data reading system 100 is used over a period of time the processor of the data reading system 100 is able to adapt the threshold based on repeated instances (e.g., repeated removal of the data reader 200 from the base unit 300). Removal dynamics data, such as speed, direction, etc., may be captured by the data reading system 100 to with adjusting the predetermined threshold. Such instances may include when the threshold was surpassed but the data reader 200 was not removed from the base unit 300 or instances when the threshold was not surpassed but the data reader 200 was removed from the base unit 300. Based on gathered data, the threshold is adapted to better predict the probability of the data reader 200 being removed from the base unit 300.

In some embodiments, responsive to a threshold change being detected by the proximity sensor, the data reading system 100 may enact a different action other than changing the charging current. In another embodiment, the data reading system 100 may change the power used to charge the power supply 222 of the data reader 200. In some instances, the power may be reduced or stopped entirely.

Usually when the data reader 200 is placed on or within the base unit 300, the data reading system 100 places the data reader 200 into an idle state (i.e., "sleep mode") to conserve power in the power supply 222. In some embodiments, responsive to the threshold change being detected, the data reading system 100 may activate the data reader 200 from an idle state to an active state. In this manner, the data reader 200 will activate sooner than usual, enabling the user to start using the data reader 200 faster than usual.

In some embodiments, the proximity sensor may be used to activate a locking mechanism. For example, after the user cradles the data reader 200 on the base unit 300, the data reading system 100 detects when the user removes their hand 10 from the data reader 200 and the data reading system 100 may activate a locking mechanism to secure the data reader 200 to the base unit 300. The locking mechanism may be a plastic or metal stem that extends from the base unit 300 into a stem receiving portion of the data reader 200. When the stem extends into the stem receiving portion, the data reader 200 is secured (e.g., locked) to the base unit. Other types of locking mechanism are also contemplated and within the scope of this disclosure.

In some embodiments, responsive the threshold change in capacitance being detected and the data reading system 100 predicting the user is about to remove the data reader 200 from the base unit 300, the data reading system 100 may deactivate the locking mechanism and unlock the data reader 200 from the base unit 300. For example, the stem may be retracted from the stem receiving portion of the data reader 200, enabling the user to remove the data reader 200 from the base unit 300.

Figure 6:
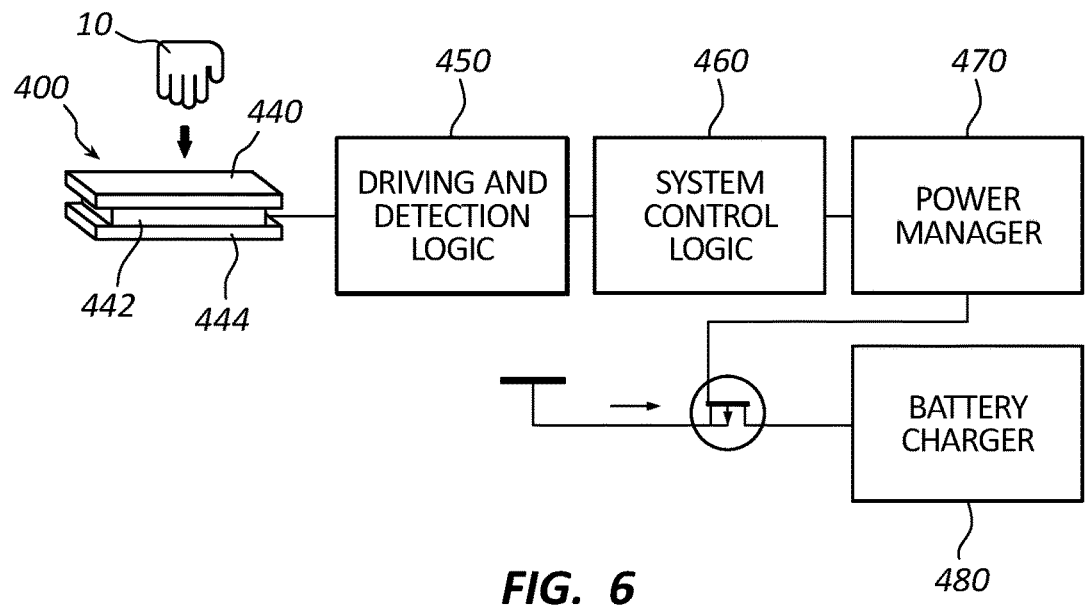
FIG. 6 is a block diagram illustrating internal components of the circuity for the capacitive sensor.

FIG. 6 is a block diagram illustrating internal components of the circuity for the capacitive sensor 400. The capacitive sensor 400 (e.g., pad) includes an upper plastic substrate 440, a metal plate 442, and a lower insulator 444. The metal plate 442 may be thin copper plate. The data reading system 100 further includes detection logic 450 for determining if the threshold change has been surpassed. As discussed previously, the threshold may be adaptable over time depending on whether the data reader 200 is removed from the base unit 300. The data reading system 100 further includes system control logic 460. The system control logic 460 is similar to the logic described in FIG. 5, and also the control logic has the ability to adapt the threshold change in capacitance to adapt the threshold over repeated removals of the data reader 200 from the base unit 300. The data reading system 100 may further include a power manager 470 that manages the charging current and voltage when the threshold change is surpassed. A battery charger 480 is configured to charge the power supply 222 of the data reader 200 when the data reader 200 is on or within the base unit 300.

Figure 7:
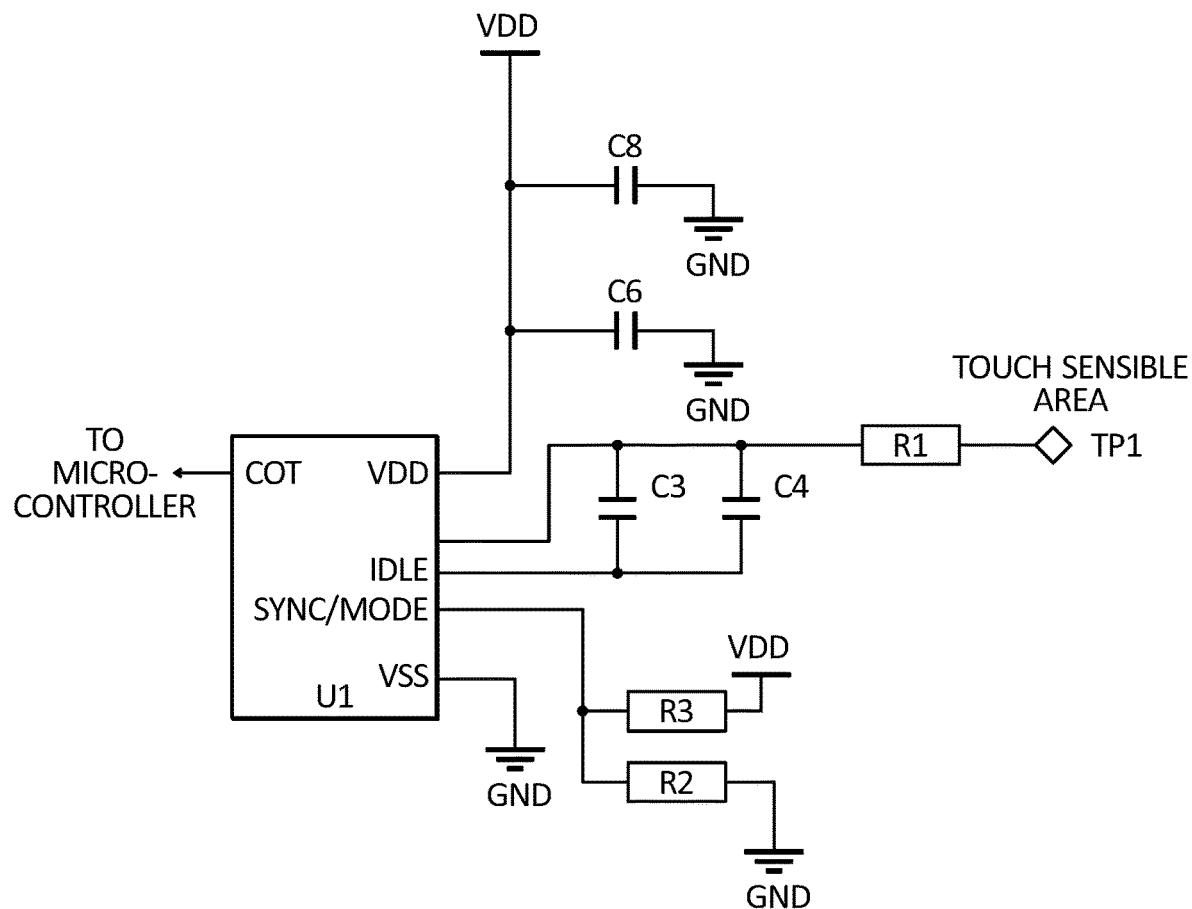
FIG. 7 is a detection logic circuit for the capacitive sensor.

FIG. 7 illustrates an exemplary embodiment of the detection logic circuit. The integrated circuit U1 shown in FIG. 7 may be the AT42QT1011 integrated circuit manufactured by Microchip Technology. This detection logic circuit illustrated in FIG. 7 enables the data reading system 100 to predict removal of the data reader 200 from the base unit 300 with an advance of 250 ms.

It is intended that subject matter disclosed herein can be combined with the subject matter of one or more of other portions herein as long as such combinations are not mutually exclusive or inoperable. In addition, many variations, enhancements, and modifications of the imager-based optical code reader concepts described herein are possible.

The terms and descriptions used above are set forth by way of illustration only and are not meant as limitations. Those skilled in the art will recognize that many variations can be made to the details of the above-described embodiments without departing from the underlying principles of the invention.

The invention claimed is:

1. A data reading system for reading encoded data on an item, the data reading system comprising:
a data reader including a power supply and a first inductive coil;
a base unit separate and distinct from a wall outlet, and configured to receive the data reader and to wirelessly charge the power supply of the data reader when the data reader is coupled with the base unit, wherein the base unit comprises a second inductive coil that aligns with the first inductive coil when the data reader is received in the base unit to facilitate wireless power transfer from the second inductive coil to the first inductive coil;
a sensor configured to detect an approach of a user's hand; and
a processor in operable communication with the sensor and the base unit, the processor configured to:
adjust an amount of wireless power transfer from the second inductive coil in the base unit to the first inductive coil in the data reader responsive to the sensor detecting the approach of the user's hand to reduce or eliminate the wireless power transfer before the data reader is removed from the base unit;
initiate a timeout period for a predetermined amount of time responsive to the detection of the approach of the user's hand;
after expiration of the timeout period, determine if the data reader was removed from the base unit after adjusting the wireless power transfer; and
increasing the wireless power transfer to charge the data reader in the base unit responsive to determining that the data reader was not removed within the predetermined amount of time for the timeout period.

2. The data reading system of claim 1, wherein the sensor comprises at least one of an infrared sensor, a light sensor, or a capacitive sensor.

3. The data reading system of claim 1, wherein the processor is configured to reduce the wireless power transfer responsive to the sensor detecting the approach of the user's hand.

4. The data reading system of claim 3, wherein the processor is configured to stop the wireless power transfer responsive to the sensor detecting the approach of the user's hand.

5. The data reading system of claim 1, wherein the data reader comprises a handle for gripping the data reader, and wherein the sensor is a capacitive sensor disposed within the handle of the data reader.

6. The data reading system of claim 1, wherein the sensor is a capacitive sensor disposed within the base unit.

7. The data reading system of claim 6, wherein the capacitive sensor comprises at least three pads disposed in a transverse direction of the base unit.

8. The data reading system of claim 6, wherein the capacitive sensor detects a threshold change in capacitance in response to a specific gesture by a user.

9. The data reading system of claim 1, wherein the sensor is a capacitive sensor, and the capacitive sensor is configured to predict the approach of the user's hand based, at least in part, on a change in capacitance crossing a threshold.

10. The data reading system of claim 9, wherein the threshold in capacitance adapts over time based on the determination of whether the data reader was removed following the measured capacitance crossing the threshold to better predict removal of the data reader from the base unit.

11. The data reading system of claim 9, further comprising a locking mechanism that is triggered responsive to the capacitive sensor detecting a threshold change in capacitance due to the user removing their hand from the data reader or the user's hand approaching the data reader.

12. The data reading system of claim 1, wherein the data reader is a handheld portable device configured for scanning and reading barcodes.

13. The data reading system of claim 1, wherein the base unit comprises a plurality of inductive coils configured to generate an electromagnetic field for the wireless power transfer.

14. The data reading system of claim 1, wherein the base unit is one of a cradle or a charging pad.

15. A method of charging a data reader in a base unit separate and distinct from a wall outlet, the method comprising:
initiating wireless power transfer between a wireless power transmitter of the base unit and a wireless power receiver of the data reader to charge a power supply of the data reader responsive to the data reader is being coupled with the base unit;
detecting, via a sensor, an approach of a user's hand to remove the data reader from the base unit;
adjusting the amount of current applied to charge the power supply of the data reader responsive to the sensor detecting an approach of the user's hand to reduce or eliminate the wireless power transfer between the base unit and the data reader;
initiate a timeout period for a predetermined amount of time responsive to the detection of the approach of the user's hand; and
after expiration of the timeout period, determining if the data reader was removed from the base unit after adjusting the wireless power transfer; and
increasing the amount of current to charge the data reader in the base unit responsive to determining that the data reader was not removed within the predetermined amount of time for the timeout period.

16. The method of claim 15, wherein adjusting the wireless power transfer is responsive to the sensor detecting the approach of the user's hand.

17. The method of claim 15, wherein the wireless power transfer is stopped to charge the power supply of the data reader in the base unit responsive to the sensor detecting the approach of the user's hand.

18. The method of claim 15, wherein the sensor is a capacitive sensor, and the capacitive sensor predicts the approach of the user's hand based on a measured change in capacitance crossing a threshold, the method further comprising:
   adapting the threshold in capacitance over repeated removal of the data reader from the base unit based on the determination of whether the data reader was removed following the measured capacitance crossing the threshold to better predict removal of the data reader from the base unit.

19. The method of claim 15, further comprising activating the data reader responsive to the sensor detecting the approach of the user's hand.

20. The method of claim 15, wherein the base unit comprises a plurality of capacitive sensors and the amount of current applied to charge the data reader does not change until at least a predetermined number of the capacitive sensors detects a threshold change in capacitance.

* * * * *